United States Patent [19]
Gerding et al.

[11] Patent Number: 5,938,501
[45] Date of Patent: Aug. 17, 1999

[54] MULTI-AXIS PROCESSING MACHINE AND METHOD FOR FORMING THE INTERIOR AND EXTERIOR SURFACES OF AQUATIC VEHICLES

[75] Inventors: William J. Gerding; Jack N. Rabun, Jr., both of Cadillac, Mich.

[73] Assignee: Wedin International, Inc., Cadillac, Mich.

[21] Appl. No.: 08/801,163

[22] Filed: Feb. 18, 1997

Related U.S. Application Data

[60] Provisional application No. 60/011,911, Feb. 20, 1996.

[51] Int. Cl.[6] ............................. B24B 49/00; B24B 51/00
[52] U.S. Cl. ..................................... 451/5; 451/9; 451/11
[58] Field of Search .................................. 451/5, 6, 8, 9, 451/10, 11, 27, 89, 913; 409/132, 137, 139, 190, 191, 197, 201, 202, 211, 212, 218, 210; 483/54, 55, 56, 1, 4; 269/46

[56] References Cited

U.S. PATENT DOCUMENTS

| | | | |
|---|---|---|---|
| 2,007,180 | 7/1935 | Doran et al. ............................. | 409/212 |
| 2,734,428 | 2/1956 | Onsrud .................................... | 409/201 |
| 3,527,268 | 9/1970 | Ginsburgh . | |
| 3,559,256 | 2/1971 | Lemelson ................................... | 408/3 |
| 3,559,530 | 2/1971 | Wagner .................................... | 409/190 |
| 3,589,134 | 6/1971 | Hackmann et al. . | |
| 3,650,178 | 3/1972 | Appleton .................................... | 90/15 |
| 3,906,834 | 9/1975 | Gladwin .................................... | 409/197 |
| 4,562,671 | 1/1986 | Bouillon et al. ........................ | 451/388 |
| 4,577,535 | 3/1986 | Klabunde et al. ....................... | 409/191 |
| 4,742,609 | 5/1988 | Neumann ................................... | 408/56 |
| 4,776,135 | 10/1988 | Thum, III et al. . | |
| 4,876,760 | 10/1989 | Rabourn et al. . | |
| 4,907,371 | 3/1990 | Shoda et al. . | |
| 4,993,199 | 2/1991 | Hughes ...................................... | 51/426 |
| 5,047,089 | 9/1991 | Grant ........................................ | 134/21 |
| 5,154,643 | 10/1992 | Catania et al. .......................... | 409/202 |
| 5,238,340 | 8/1993 | Ochiai et al. ............................ | 409/202 |
| 5,283,982 | 2/1994 | Harper, Jr. et al. . | |
| 5,291,692 | 3/1994 | Takahashi et al. ....................... | 451/388 |
| 5,340,247 | 8/1994 | Cuneo et al. ........................... | 409/191 |
| 5,375,952 | 12/1994 | Line ......................................... | 409/202 |
| 5,383,500 | 1/1995 | Dwars et al. . | |
| 5,407,415 | 4/1995 | Spishak .................................... | 409/202 |
| 5,429,460 | 7/1995 | Campian ................................... | 409/202 |
| 5,512,005 | 4/1996 | Gulling ..................................... | 451/29 |
| 5,609,190 | 3/1997 | Anderson et al. . | |

Primary Examiner—David A. Scherbel
Assistant Examiner—Derris Holt Banks
Attorney, Agent, or Firm—Rader, Fishman, Grauer & McGarry

[57] ABSTRACT

The invention relates to a device for performing contouring operations on a three-dimensional member, such as boat hulls, decks and molds. The device comprises a first frame and a second frame wherein the second frame is movably mounted to the first frame. A robotic arm is movably mounted to the second frame whereby a distal end of the arm is positionable in three dimensions with respect to the member. The distal end of the arm is adapted to carry a tool thereon. The structure of the first frame defines a pair of working chambers therein and a passageway so that the arm can travel therebetween. A controller is interconnected to the arm and the first and second frames for controlling the position of the second frame with respect to the first frame, the arm with respect to the second frame, and the distal end of the arm with respect to the arm. The tool on the arm can thereby be positioned to abut the member and perform contouring operations thereon.

44 Claims, 4 Drawing Sheets

MULTI-AXIS PROCESSING MACHINE AND METHOD FOR FORMING THE INTERIOR AND EXTERIOR SURFACES OF AQUATIC VEHICLES

CLAIM OF PRIORITY

This application claims the benefit of U.S. Provisional Application Ser. No. 60/011,911, filed on Feb. 20, 1996.

BACKGROUND OF THE INVENTION

1. Field of the Invention

This invention relates generally to a forming machine and, more particularly, to a forming machine for milling a member, such as a boat hull, having complex contours.

2. Description of Related Art

Currently, aquatic vehicles such as boats arc formed by assembling; two fiberglass molded members—a hull and a deck. Unfortunately, the known molding processes do not produce a "clean" hull and deck, each member must be "finished" before the aquatic vehicle is ready. Each member portion must be trimmed to remove any flash from the molding process and further cut to provide any design features such as vents, ports and the like. In addition, holes are drilled in each member so that the two members can be fastened together by conventional threaded fasteners to form the final assembly such as a boat or personal watercraft. The additional trimming, drilling and cutting steps are currently performed by hand following the initial bond molding process. A worker must grind the surfaces of the above-identified portions with as many as ten hand tools such as router bits and drill bits in order to create the finished product.

Several problems have arisen during this finishing process. Completing the finishing steps on both the hull and deck can take a significant amount of time, and labor. The tools used to grind the hull and deck portions produce a large amount of dangerous airborne fiberglass particles which are extremely harmful to the workers. In addition, use of these hand tools over an extended period can cause physical injury to the workers including tendinitis and carpal tunnel syndrome. Finally, the use of the hand tools by human workers creates a lack of consistency when aquatic vehicles of a particular model are mass produced so that a comparison of these aquatic vehicles could reveal several major and minor inconsistencies between them.

SUMMARY OF INVENTION

In one aspect, the invention relates to a device for performing contouring operations on a three-dimensional member. The device preferably comprises a first frame, a second frame movably mounted to the first frame which cooperates to define a first chamber and a second chamber. An arm is mounted to the second frame and is positionable in three dimensions in the first and second chambers. The arm can perform forming operations in both chambers. At least one of the first and second frames preferably defines a passageway between the first and second chambers.

The arm is preferably movably mounted to the second frame and has an end distal from the first and second frames adapted to carry a tool thereon. The arm is positionable with respect to the first and second frames and is adapted to travel through the passageway between the first and second chambers.

A controller is interconnected to the arm and the first and second frames for controlling the position of the second frame with respect to the first frame, the arm with respect to the second frame, and the distal end of the arm with respect to the arm.

The device preferably further comprises at least one positioning sensor mounted to the first frame and interconnected to the controller to signal the position of the second frame with respect to the first frame. Additionally, the device can also comprise at least one positioning sensor mounted to the second frame and interconnected to the controller to signal the position of the arm with respect to the second frame. The first frame is preferably suspended in an elevated position and is defined by a forward beam, a rearward beam and a pair of side beams interconnected at their respective ends to form a rectangular frame. The first frame can have a central beam which divides the first frame into the first and second chambers. The central beam is preferably offset with respect to the first frame to define the passageway through which the arm can travel between the first and second chambers.

The first frame is preferably suspended by a plurality of posts having one end mounted to the first frame and a second end supported on a ground surface. One of the first and second frames preferably has a rail mounted thereon and the other has a slide mounted thereon. The rail is slidably received within the slide to mount the second frame to the first frame for slidable movement.

One of the first and second frames preferably has a rack gear and the other has a pinion gear powered by a motor. The rack gear and pinion gear are preferably mounted to the first and second frames so that the pinion gear is intermeshed with the rack gear whereby actuation of the motor moves the second frame with respect to the first frame. A similar arrangement is contemplated to mount the arm to the second frame for slidable movement.

The arm preferably comprises a housing mounted to the second frame for slidable motion with respect thereto and an arm assembly having a distal end and a proximal end. The proximal end of the arm is mounted to the housing and the distal end has a tool mount for selectively receiving a tool. The arm assembly preferably comprises a first link, a second link, and a third link interconnected by pivotable joints. The arm assembly is preferably rotatably mounted to the housing. The arm can include an optical scanning device adapted to detect indicia on a member adjacent the arm. The arm can also include a stylus tool adapted to send coordinate data of a three-dimensional object located adjacent the arm to the controller.

The device preferably further comprises a tool bin located adjacent the first frame from which a tool can be selected by the arm. The tool bin can comprise a carousel which removably mounts several tool bits therein and defines a bit removal area thereon. The controller can position the arm or the carousel at the bit removal location whereby the arm can remove a tool therefrom.

The device preferably further comprises a vacuum filtration system adapted to collect airborne particles generated by the forming operations adjacent the distal end of the arm. The vacuum filtration system preferably comprises a vacuum source, a conduit having one end fluidly connected to the vacuum source and an opposite end mounted adjacent the distal end of the arm and at least one filter located between the vacuum source and the end of the conduit. Actuation of the vacuum source suctions particles located adjacent the end of the conduit and traps them in the filter. The filter can comprise a first filter and a second filter fluidly interconnected. The first filter can be is a cyclonic drum filter. The second filter can be a HEPA filter. A boom assembly can be supported in an elevated position which has an end mounting a portion of the conduit whereby the boom assembly maintains slack in the conduit.

At least one vacuum carriage can be located in one of the first and second chambers whereby the vacuum carriage can fixably support a three-dimensional member. The vacuum carriage can comprise a base and a support member removably mounted to base for supporting the three-dimensional member in a fixed position. The base preferably has at least two ground-engaging wheels. The support member is preferably interconnected to vacuum source whereby the vacuum source draws the three-dimensional member against the support member to prevent the member from moving with respect to the first frame. The support member can include at least one post having an axial socket located in a distal end thereof. The device preferably further comprises a cylinder having an axial piston movable between a retracted position and an extended position whereby in the extended position the piston is received in the axial socket of the support member to fixedly position the support member with respect to the first frame.

The device can be provided with various safety devices such as a safety barrier mounted adjacent the perimeter of the first frame, a safety speaker which emits an audible warning during operation of the device, a safety light which emits a visible warning during operation of the device and a light curtain located around the perimeter of the first frame. The light curtain preferably comprises an optical emitter which emits a light signal and an optical detector adapted to detect the light signal from the optical emitter. When the device is actuated, an interruption of the light signal from the optical emitter causes the optical emitter or the optical detector to send a signal to the controller to suspend actuation of the device.

In another aspect of the invention, a carriage for supporting a three-dimensional member during contouring operations thereon preferably comprises a vacuum source and a support member having a working surface which has at least one conduit thereon fluidly interconnected to the vacuum source. The location of a three-dimensional member adjacent the working surface and actuation of the vacuum source produces a vacuum through the at least one conduit which draws the three-dimensional member against the working surface of the support member. The three-dimensional member is thereby prevented from moving during the contouring operations. The support member can include at least one post having an axial socket located in a distal end thereof. The carriage can further comprise a cylinder having an axial piston movable between a retracted position and an extended position. In the extended position, the piston is received in the axial socket of the support member and fixably retains, the support member. The base can have at least two ground-engaging wheels.

In an additional aspect of the invention, a method of forming contours on a three-dimensional object comprises the steps of providing: a first frame defining first and second chambers, a second frame movably mounted to the first frame, an arm movably mounted to the second frame, a tool on an end of the arm distal from the first and second frames, and a passageway between the first chamber and the second chamber whereby the arm can travel therebetween. The second frame can then be positioned with respect to the first frame, the arm with respect to the second frame, and the tool with respect to the arm. The tool is contacted with the object and operations are performed on the object. The tool is then removed from the object.

These steps are repeated as necessary to form desired contours on the object.

BRIEF DESCRIPTION OF THE DRAWINGS

The invention will now be described with reference to the drawings wherein.

DESCRIPTION OF THE PREFERRED EMBODIMENTS

Figures 1, 4:
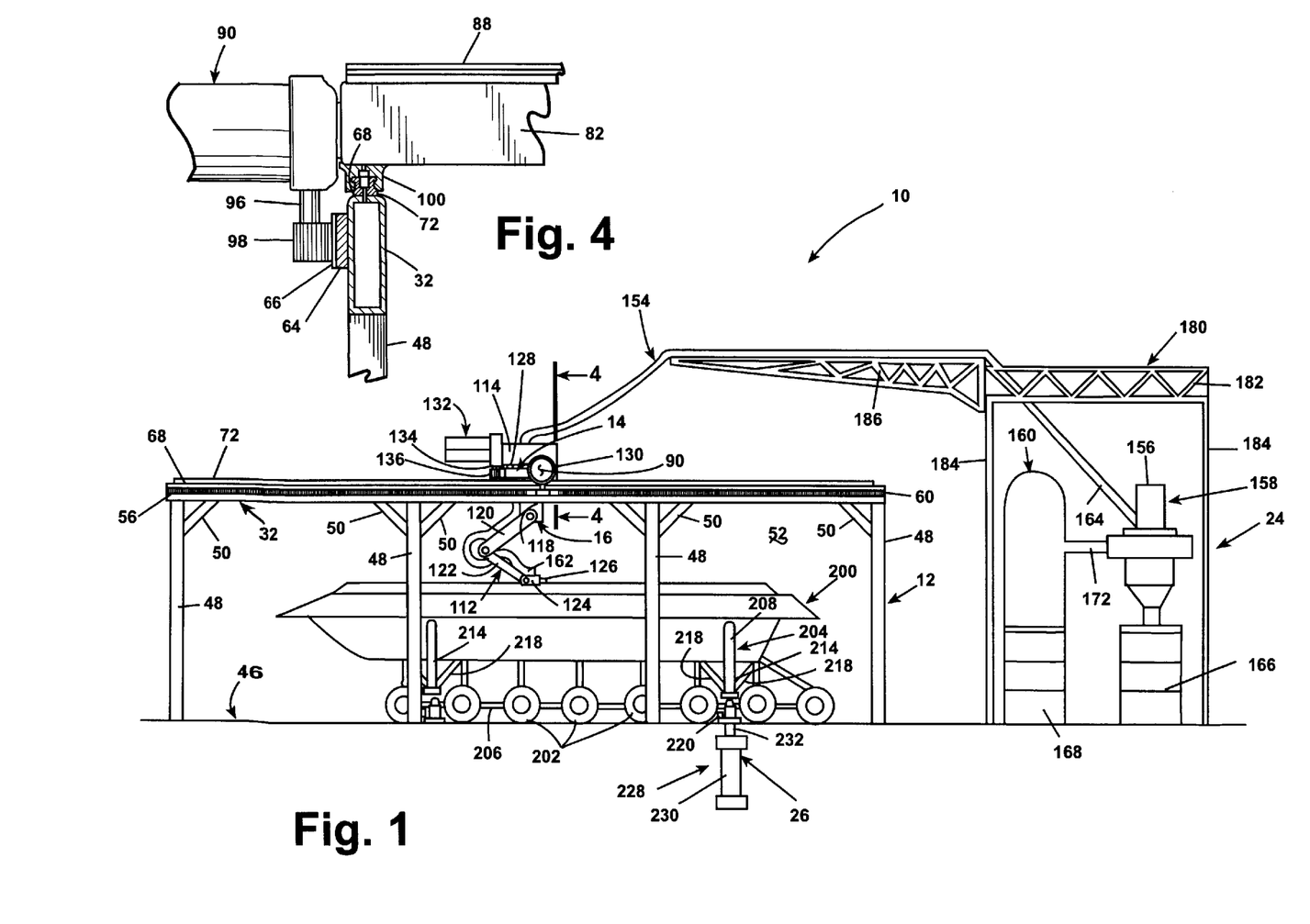
FIG. 1 is a side elevational view of the multi-axis processing machine according to the invention.
FIG. 4 is a cross-sectional view of a portion of the processing machine taken along lines 4—4 of FIG. 1.
Figure 2:
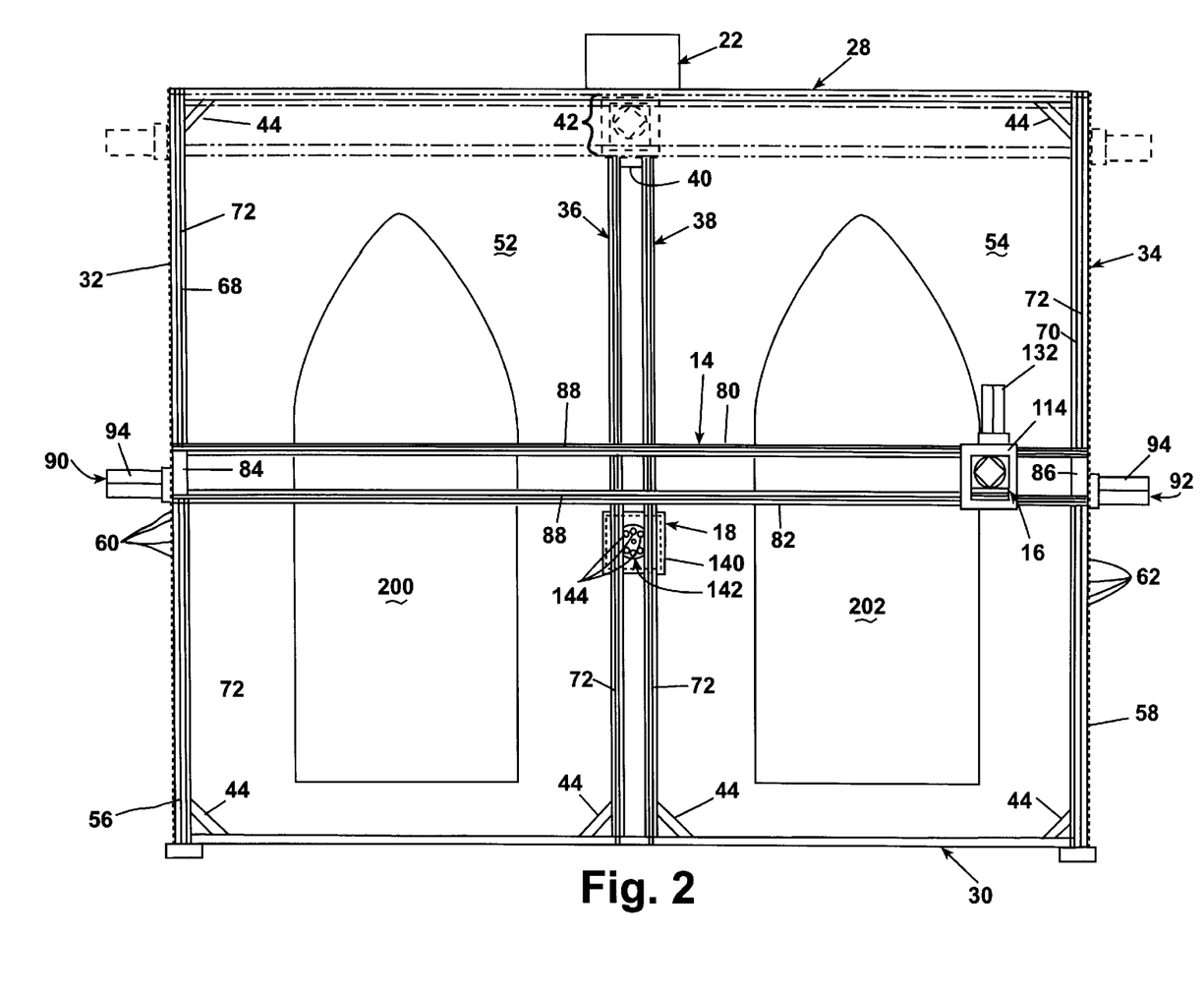
FIG. 2 is a top view of the processing machine of FIG. 1.
Figure 3:
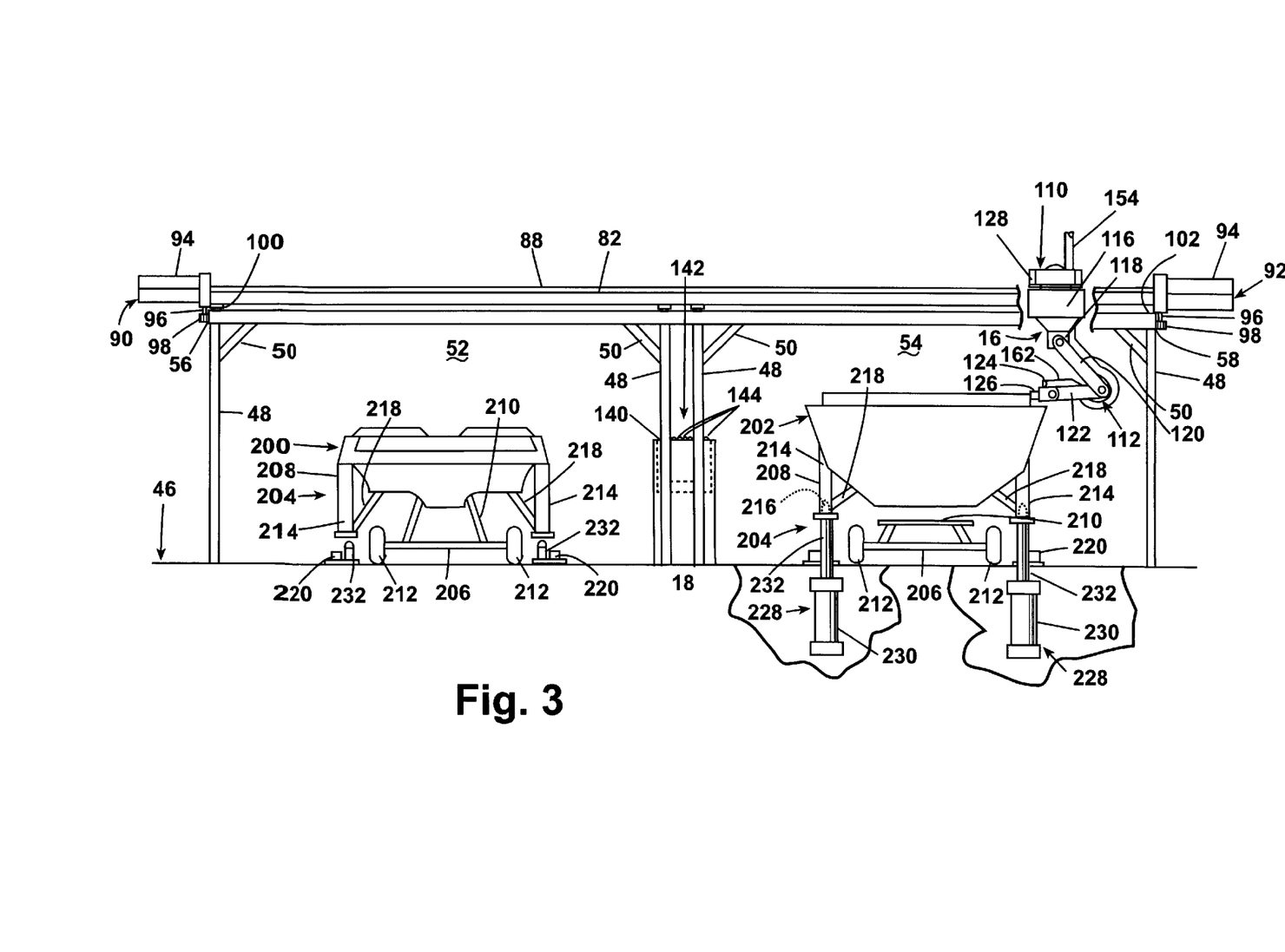
FIG. 3 is a rear elevational view of the processing machine of FIG. 1.

Referring now to the drawings and to FIGS. 1–3 in particular, the processing machine 10 according to the invention comprises a stationary frame 12 and a moveable frame 14 onto which a robotic arm 16 is mounted. The arm 16 is adapted to select one of several tool bits from a tool bin 18 and perform finishing steps on a member 200 in response to signals from a computer controller 22.

In one aspect of the invention, the machine 10 can receive the member 200 following a molding process which forms the member 200 from fiberglass. In an alternative aspect, the machine 10 can receive an unformed mass of material and cut a "plug," or a reverse component which can be coated with a resilient substance and used as a mold for producing molded members such as boat hulls or decks. Further, it will be understood that, although this specification refers to a member 200 as a boat hull or deck, the machine 10 can be used to form any three-dimensional member defined in, and controlled by, the controller 22.

A vacuum filtration system 24 cleans the air surrounding the machine from any fiberglass dust produced during the process. A lifting system 26 retains the member 200 in a fixed position with respect to the frame 12. The invention also contemplates several safety features to prevent injury to anyone standing nearby the machine 10 during operations.

The stationary frame 12 comprises a forward beam 28, a rearward beam 30, first and second side beams 32 and 34, respectively, and a pair of central beams 36 and 38. The first and second side beams 32 and 34 are mounted to opposite corresponding ends of the forward and rearward beams 28 and 30, respectively, to form a substantially rectangular frame as shown in FIG. 2. The first and second side beams 32 and 34 can be mounted to the forward and rearward beams 28 and 30 by any conventional fastening means including but not limited to welding, rivets and threaded fasteners. The central beams 36 and 38 are mounted in a spaced relationship adjacent a medial portion of the rearward beam 30 and extend forwardly therefrom, parallel to the first and second side beams 32 and 34. The central beams 36 and 38 terminate a short distance rearward of the forward beam 28. A short connector beam 40 is mounted to and extends between the central beams 36 and 38 at the forward ends thereof. A gap 42 is defined between a rearward face of the forward beam 28 and a forward face of the connector beam 40. The stationary frame 12 can be laterally reinforced by several braces 44 mounted diagonally between intersection points between the above-identified beams as shown in FIG. 2. The stationary frame 12 is spaced vertically from a ground surface 46 by a plurality of posts 48 mounted to the movable frame 12 and extending perpendicularly to the ground 46. The mounting between the posts 48 and the movable frame 12 can be further reinforced by several diagonal braces 50 mounted between the posts 48 and the movable frame 12. At a minimum, the posts 48 should be located at the four corners of the stationary frame 12 and under the ends of the central beams 36 and 38. Additional posts 48 can be disposed along interior locations of the movable frame 12 as structurally required. The central beams 36 and 38 divide the stationary frame 12 into first and second working chambers 52 and 54, respectively. Alternatively, the stationary frame 12 can be constructed without the central beams 36 and 38 to define only one working chamber or more than two chambers therein.

The first and second side beams 32 and 34 include outwardly-facing, vertical surfaces 56 and 58, respectively. Each surface 56 and 58 is provided with a longitudinally-extending rack gear 60 and 62, respectively. The rack gears 60 and 62 each comprise a longitudinal strip 64 having several outwardly-extending teeth 66 as shown in FIG. 4. A preferred embodiment of the rack gear is available from Martin Sprocket & Gear, 3100 Sprocket Drive, Arlington, Tex., 76015-2898.

The first and second side beams 32 and 34 further include a top surface 68 and 70, respectively. Each top surface 68 and 70 is provided with an upwardly-extending rail 72 which comprises an upwardly-extending rounded rectangular flange provided with longitudinal grooves along each side thereon. The central rails 36 and 38 also include rails 72 mounted to the upper surface of each beam.

The movable frame 14 comprises first and second longitudinal beams 80 and 82, respectively. First and second connectors 84 and 86 are mounted at opposite ends of the first and second beams 80 and 82 so that the movable frame 14 essentially comprises a narrow, longitudinally-extending rectangular frame as shown in FIG. 2. A forwardly-facing surface of the first beam 80 includes a longitudinal rack gear 99 of a similar model and construction as the rack gears 60 and 62 mounted to the first and second side beams 32 and 34, respectively. A bottom surface of the connectors 84 and 86 each mount one or more linear slides 100 and 102, respectively, as shown in FIG. 3 and in greater detail in FIG. 4. A preferred embodiment of the linear slides 100 and 102 is the LRWH-series linear way manufactured by IKO International, Inc., Fox Hill Industrial Park, 91 Walsh Drive, Parsippany, N.J., 07054.

The first and second beams 80 and 82 of the movable frame 14 each include an upper surface provided with an upwardly-extending rail 88 of the same construction and mounting as the rail 72 on the stationary frame 12. A first and second motor 90 and 92 are mounted to the connectors 84 and 86, respectively, at each end of the movable frame 14. Each motor 90 and 92 comprises a motor installed within a housing 94 which can transmit rotation to a downwardly-extending shaft 96. The shaft 96 includes a bottom end onto which is mounted a radially-extending pinion gear 98. A preferred example of the first and second motors 90 and 92 is available from Yaskawa Electric America, Inc., 2942 MacArthur Blvd, Northbrook, Ill., 60062.

To mount the movable frame 14 to the stationary frame 12, the rail 72 on the first side beam 32 is slidably received within the linear slide 100 on the connector 84 of the movable frame 14. The rail 72 on the second side beam 34 is slidably received within the linear slide 102 on the connector 86 of the movable frame 14. The linear slides 100 and 102 are mounted to the rail 72 of the first and second side beams 32 and 34, respectively, so that the respective pinion gears 98 of the first and second motors 90 and 92 engage the teeth 66 of the gear racks 60 and 62 of the first and second side beams 32 and 34.

The robotic arm 16 comprises a housing 110 and an arm assembly 112. The housing 110 comprises a rectangular frame 114 having a central rectangular aperture (not shown) and a downwardly-depending cylindrical body 116. The cylindrical body 116 houses the control components of the robotic arm 16 for coordinate positioning and geometric control of the arm assembly 112. A bottom portion of the cylindrical body 116 includes a cylindrical flange 118 rotatable in a full 360° range of movement. The arm assembly 112 is pivotably mounted to the flange 18. The arm assembly 112 comprises an upper arm link 120, a forearm link 122, a wrist link 124 and tool mount 126. The upper arm link 120 is mounted at one end to the flange 118 for pivotable and swingable movement. The opposite end of the upper arm link 120 is pivotally and swingably mounted to the forearm link 122 while the opposite end of the forearm link 122 is pivotally and swingably mounted to the wrist link 124. An opposite end of the wrist link 124 is provided with the tool mount 126 which is adapted to receive an end of a tool bit and can further include a motor for rotating a received tool bit at high speeds and high torques. One preferred embodiment of the robotic arm 16 is the Motoman Model No. YR-K10S, robot arm available from Triad Associates, 1532 N. Opdyke—Suite 600, Auburn Hills, Mich., 48326.

The rectangular frame 114 includes several linear slides 128 and 130 mounted to the underside of opposite sides of the rectangular frame 114. The linear slides 128 and 130 are of similar configuration as the linear slides 100 and 102 mounted to the movable frame 14. A motor 132, of a similar model and construction as the first and second motors 90 and 92 mounted to the moveable frame 14, is mounted to a side wall of the rectangular frame 114 and extends laterally outwardly therefrom. The motor 132 also includes a downwardly-extending shaft 134 onto which a radially-extending pinion gear 136 is mounted. The motor 132, upon receipt of an appropriate signal, provides rotational motion to the shaft 134 and thereby to the pinion gear 136.

In assembly, to mount the robotic arm 16 to the moveable frame 14, the linear slides 128 and 130 mounted to the underside of the rectangular frame 114 are slidably mounted to the rails 88 on the first and second beams 80 and 82, respectively, of the movable frame 14 for slidable movement therein. The rectangular frame 114 of the robotic arm 16 is further mounted so that the motor 132 extends outwardly adjacent the first beam 80 of the moveable frame 14 so that the pinion gear 136 of the motor 132 engages the rack gear 99 located on the first beam 80 of the movable frame 14. When the mounting is complete, the cylindrical body 116 and the arm assembly 112 extend downwardly between the first and second beams 80 and 82 of the movable frame 14 as shown in FIGS. 1 and 3.

The tool bin 18 comprises a cabinet having a recess 140 extending downwardly from an upper surface thereof. A tool carousel 142 is mounted within the recess 140 of the tool bin 18 and carries plurality of tool bits 144 which are removably mounted thereto and can be optionally selected by the tool mount 126 of the robotic arm 16 to perform finishing operations on aquatic vehicles. The tool bits 144 can be removably mounted within particular locations on the tool carousel 142 so that the robotic arm 16 can travel to a particular location over the tool bin 18 to select a particular bit 144 upon a signal from the controller 22. Alternatively, the tool carousel 142 can be rotationally mounted within the tool bin 18 so that it can be spun to locate a particular tool bit 144 at a particular location upon a signal from the controller 22. Then, the robotic arm 16 can select whichever tool is positioned at a standard location. Alternatively, the tool bin 18 can be any apparatus which mounts a plurality of tool bits for selective mounting within a tool mount of a robotic arm.

The robotic arm 16 is mounted for lateral slidable movement along the longitudinal path defined by the rails 88 on the first and second beams 80 and 82 of the movable frame 14. In turn, the moveable frame 14 is mounted to the stationary frame 12 for forward and rearward slidable movement along the path defined by the rails 72 on the first and second side beams 32 and 34 of the stationary frame 12. The engagement of the pinion gear 13-6 of the motor 132 within the rack gear 99 of the first beam 80 of the moveable frame 14 provide, the motive means for slidable movement along the first and second beams 80 and 82. As the motor 132 is actuated, it imparts rotation to the pinion gear 136 through the shaft 134. As the pinion gear 36 is rotated, it engages successive teeth along the rack gear 99 of the first beam 80 of the moveable frame 14 causing the robotic arm 16 to slide along the rails 88 of the first and second beams 80 and 82 through the linear slides 128 and 130, respectively. Synchronous actuation of the motors 90 and 92 attached to the moveable frame 14 causes the motors 90 and 92 to impart rotation to the pinion gears 98 through each respective shaft 96. As the pinion gears 98 are rotated by each motor 90 and 92, the pinion gears 98 engage successive teeth of the first and second rack gears 60 and 62 of the first and second side beams 32 and 34, respectively, of the stationary frame 12 causing the moveable frame 14 to slide along the first and second side beams 32 and 34. The engagement of the rails 72 of each first and second side beam 32 and 34 within the linear slides 100 and 102 of the movable frame 14 restrain the movement of the movable frame 14 and maintain the first and second beams 80 and 82 of the moveable frame 14 perpendicular to the first and second side beams 32 and 34 of the stationary frame 12. The movable frame 14 is further restrained by the engagement of the rails 72 of the central beams 36 and 38 within the linear slides 100 and 102 mounted beneath a central portion of the movable frame 14.

It is very important to closely monitor the actuation of the motors 91), 92, and 132 to enable the robotic arm 16 to be accurately positioned with respect to both the moveable frame 14 and the stationary frame 12. Therefore, several positioning sensors (not shown are provided along the first and second side beams 32 and 34 and central beams 36 and 38 of the stationary frame 12 to provide an accurate signal of the position of the moveable frame 14 with respect to the stationary frame 12. In addition, several positioning sensors (not shown) are positioned along the first and second beams 80 and 82 of the moveable frame 14 to provide an accurate signal to the controller 22 of the position of the robotic arm 16 with respect to the moveable frame 14. A preferred embodiment of the these positioning sensors is the LB-Series Scale available from Heidenhain Corporation, 115 Commerce Drive, Schaumburg, Ill., 60173. An additional embodiment of the positioning sensor can also include the Magnascale available from Sony Corporation. In addition, the robotic arm 16 contains an internal control system which enables the tool mount 126 to be positioned by the upper arm link 120, forearm link 122 and wrist link 124 within very small tolerances. Thus, through the positioning sensors attached to the stationary frame 12 and moveable frame 14 and the control abilities of the robotic arm 16, the tool mount 126 can be positioned anywhere within the first or second working chambers 52 and 54 within very small tolerance.

The robotic arm 16 is adapted to perform contouring operations in only one of the working chambers 52 or 54 at any one particular time. In addition, because the moveable frame 14 is mounted to the central beams 36 and 38 of the stationary frame 12, the downwardly-depending robotic arm 16 cannot pass between the working chambers 52 and 54 because the downwardly-depending cylindrical body 116 of the robotic arm 16 will contact the central beams 36 and 38. However, means are provided to enable the robotic arm 16 to travel between the working chambers 52 and 54. The motors 90 and 92 are first actuated to slide the moveable frame 14 to the forward end of the stationary frame 12 adjacent the forward beam 28. The motors 90 and 92 are then deactivated. The motor 132 is them activated to cause the robotic arm 16 to slide through the gap 42 between the connector 40 and the forward beam 28 of the stationary frame 12. When the robotic arm 16 is completely within the opposite working chamber, the motors 90 and 92 are re-activated for positioning the robotic arm 16 for further contouring operations therein.

The controller 22 is shown in outline form in FIG. 2 and comprises a CNC-capable hardware and software package which is operably connected to the movable frame 14, the robotic arm 16, the tool bin 18, the vacuum filtration system 24 and the lifting system 26 so that the entire finishing process for aquatic vehicles can be controlled at one location. The controller 22 is also connected to the positioning sensors (not shown) to receive location feedback regarding the respective positions of the movable frame 14 and the robotic arm 16. One preferred embodiment of the computer controller 22 is the IBM-compatible software available from Triad associates, 1532 N. Opdyke—Suite 600, Auburn Hills, Mich., 48326.

The controller 22 can also include several features to increase the automation of the finishing process. A conventional scanning device capable of optically recognizing a pattern can be mounted to the robotic arm 16 and a known bar code pattern can be mounted to a particular location on the member. The robotic arm 16 can then trace over the surface of the member prior to any contouring operations to locate and interpret the optical pattern. The controller 22 can then read and follow a pre-programmed set of contouring instructions for finishing a particular vehicle model identified in the coded pattern.

The controller 22 can also perform self-programming steps to enable the design and finishing of new and different aquatic vehicle models. The controller 22 can interface with a "istylus" tool which is stored in the tool bin 18. When the stylus tool is mounted within the tool mount 126 of the robotic arm 16, the robotic arm 16 can trace over the surface of the aquatic vehicle and send coordinate instructions to the controller 22 which are stored and analyzed to provide a "map" of the surface of the member 200. These coordinate instructions can be interfaced with a computer-aided design/manufacturing (CAD/CAM) system to aid in the finished design of additional aquatic vehicle models. Any new designs can then be sent back to the controller 22 to form a member in accordance with the new design.

The vacuum filtration system 24 is designed to filter successively smaller particles which enter therein and includes a hose 154 comprising a flexible bellowed conduit mounted at a first end 162 adjacent the tool mount 126 of the robotic arm 16 and at a second end 164 to an inlet conduit 156. The inlet conduit 156 provides a sealed fit between the second end 164 of the hose 154 and a first filter 158. The first filter 158 is preferably of the cyclone type, provided with a pleated filter for trapping larger fiberglass particles and mounted on a 55-gallon or greater drum 166. The first filter 158 has an outlet conduit 172 extending to a second filter 160. The second filter 160 preferably includes a vacuum motor capable of moving several cubic feet per minute and provided with a HEPA filter for trapping smaller fiberglass particles and mounted over an additional 55-gallon drum 168. A preferred embodiment of the vacuum filtration system is available from Airflow Systems, Inc., 11370 Pagemill Road, Dallas, Tex., 75243.

For additional support, the hose 154 of the vacuum filtration system 24 is mounted to a boom support assembly 180 located adjacent the stationary frame 12. The boom support assembly 180 comprises a truss 182 supported above the ground 46 by several vertical legs 184. A side of the truss 182 adjacent the stationary frame 12 includes a pivotably-mounted crane 186 extending over the stationary frame 12. The hose 154 is longitudinally mounted along the length of the crane 186 which provides structural support and slack adjustment thereto. Preferred components of the boom support assembly 180 are also available from Airflow Systems, Inc., 11370 Pagemill Road, Dallas, Tex., 75243.

As shown in FIGS. 1–3, first and second members 200 and 202 are disposed within first and second working chambers 52 and 54, respectively. Each member 200 and 202 is supported on a carriage 204. The carriage 204 comprises a base 206 and a support 208. The base 206 includes a rack 210 and several ground-engaging wheels 212. The support 208 is adapted to receive an member 200 or 202 and is adapted to be removably mounted to the base 206. The support 208 includes several downwardly-extending cylindrical posts 214 which include an axial socket 216 at a downward end therein. The support 208 further includes several conduits 218 which have a longitudinal central bore (not shown) and which are fluidly connected to a lower end of a corresponding post 214. The conduits 218 are adapted to transmit a suctioning force from a vacuum pump 220 mounted within the ground 46 and applied through a lower end of the posts 214 to the member received within the support 208 so that the vacuum pump 220 suctions the member to the support 208 and fixedly retains the member thereon. The sockets 216 in the posts 214 are adapted to receive an extendable member of the lifting system 26 to raise the member into a working position. A preferred embodiment of the vacuum pump 220 used to draw the members 200 or 202 against the carriage 204 include a MF-Series Multi-Flow Vacuum Transducer Pump available from Air-Vac Vacuum Pump Division, 100 Gulf Street, Milford, Conn., 06460.

The lifter assembly 26 comprises several jacks 228 installed in a spaced relationship within the ground 46. Each jack 228 comprises a pneumatic cylinder 230 which can actuate an axially- and upwardly-extending piston 232. Each jack 228 can be fluidly connected to a source of pressurized fluid such as a vacuum pump or a pump for pressurized liquid to actuate the piston between an extended position wherein the piston 232 extends upwardly and axially from the cylinder 230 and a retracted position wherein the piston 232 is retracted into the cylinder 230. Each jack 228 is interfaced with the controller 22 for synchronous actuation of the piston 232 in each jack 228. The piston 232 in each jack 228 is adapted to be received within the socket 216 in the posts 214 of the support 208. When the piston 232 is axially extended, the piston 232 is received within the socket 216 and causes the support 208 to be lifte&. from the base 206 and maintained in a lifted position above the base 206. The lifting system 26 works in conjunction with the vacuum pump 220 so that the member 200 or 202 is maintained above the base 206 of the carriage and suctioned thereto by the pump 220.

Several safety components can be mounted to the machine 10 to protect against injury to workers standing in the vicinity of the machine 10 during operation thereof. These safety features are desirable for several reasons. For example, the contouring operations produce dangerous airborne particulate matter and the moveable frame 14 and robotic arm 16 are fast-moving parts which include a high-speed rotating tool bit 144. Therefore, the following safety features are included in a preferred embodiment of the machine 10. A physical railing is mounted around the perimeter of the stationary frame 10. The controller 22 should, produce a visible and audible warning immediately before and during any machine activity. An optical emitter is also installed adjacent the stationary frame 12 inside the perimeter of the railing. The optical emitter should produce a "light curtain" which must remain unbroken for a sufficient period of time in order for the controller 22 to initiate the finishing process. Additionally, if the light curtain is broken at any time during the process, the machine 10 will immediately shut down. Any suitable motion detector can also be employed as an additional safety device.

Figure 5:
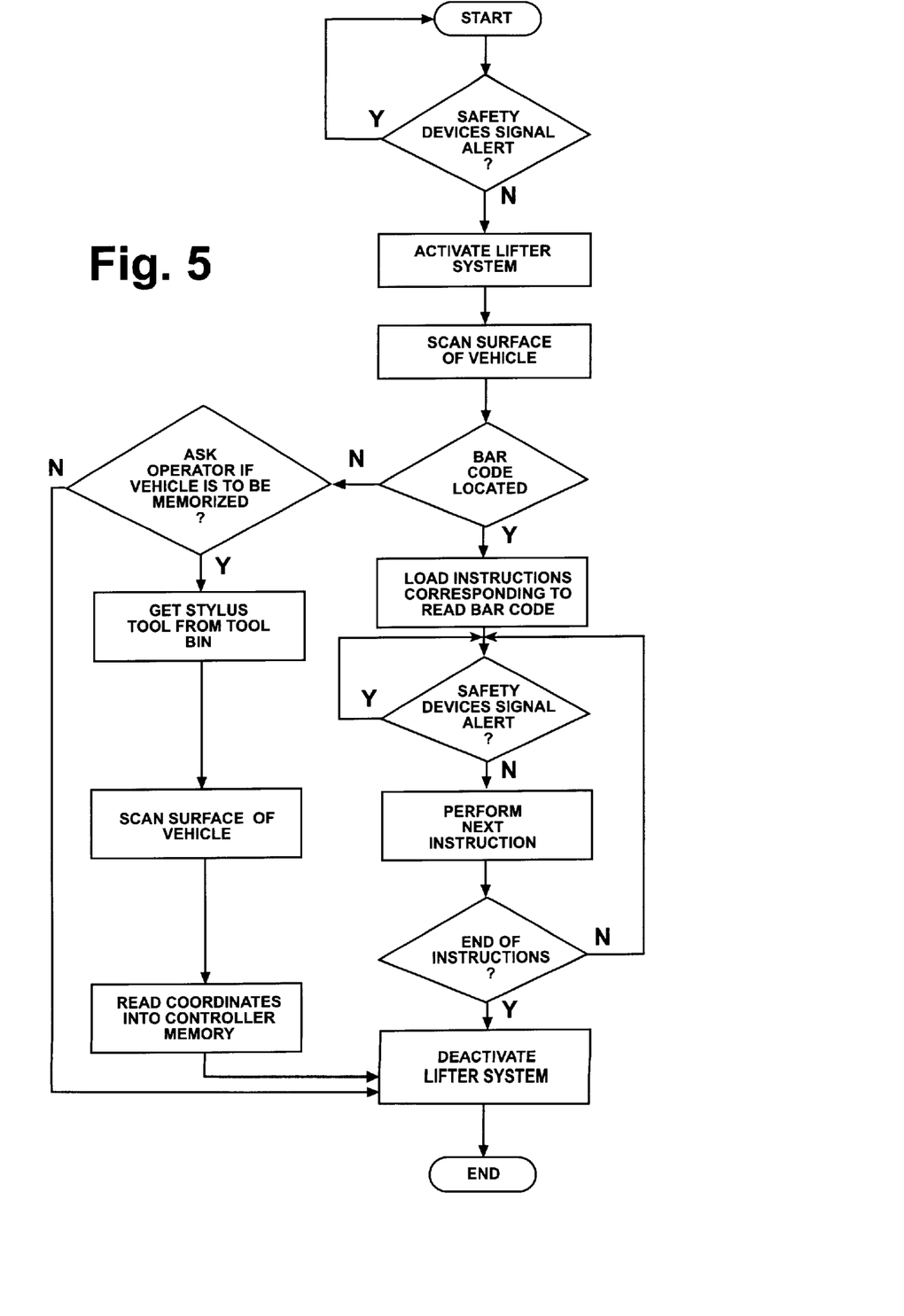
FIG. 5 is a block diagram of an example of the operational process of the machine of FIG. 1.

FIG. 5 shows an example of the instructional steps encountered by the controller 22 during the operation of the machine 10. First, a member 200 is mounted onto the support 208 of a carriage 204 and rolled into the first working chamber 52. In addition, a second member 202 can be mounted onto a support 208 of a second carriage 204 and rolled into the second working chamber 54. To begin the finishing process, all safety devices installed within and adjacent the machine 10 should signal the controller 22 that a light curtain or motion detector is clear from movement.

Next, the controller 22 activates the lifting system 26 which sends signal to each jack 228 to axially extend the pistons 232 contained therein. The pistons 232 are received within their respective sockets 216 on each post 214 of the support 208 so that the member 200 is lifted above the ground 46. The vacuum pump 220 is then activated which applies suction to the lower end of the posts 214 which, in turn, provides suction to each conduit 218. The suction from the pump 220 causes the member 200 to be drawn against the support 208. Alternatively, the vacuum pump 220 can be actuated before the lifting system 26. In this position, the member 200 is ready for the actual finishing operation.

If desired, the controller 22 can signal the robotic arm 16 to trace over the surface of the member 200 to scan for optically-readable bar code indicia on the surface thereof. If found, the controller 22 can retrieve from memory a model-specific set of contouring instructions to perform on the member 200 corresponding to the bar code. The instructions issued by the controller 22 include coordinate positions for movement of the moveable frame 14 with respect to the stationary frame 12 and for movement of the robotic arm frame 114 with respect to the moveable frame 14 with continuous feedback control provided by the positioning sensors located on each component.

In addition, the instructions can include the particular tool bit 144 contained within the tool bin 18 that the robotic arm 16 is to retrieve. Once the desired tool bit 144 is mounted within the tool mount 126, the instructions can further include positioning of the tool mount 126 with respect to the member 200. The upper arm link 120, the forearm link 22 and the wrist link 124 of the robotic arm 16 provide great flexibility in positioning the tool mount 126 and the bit 144 contained therein. During the time in which the contouring instructions are performed, the controller 122 constantly monitors the condition of the safety systems. If an alert condition is noted, the controller 22 de-activates all movement of the machine 10 to protect against injury. After all instructions have been performed, the controller 22 sends a signal to both the vacuum pump 220 and the lifting system 26 which causes the member 200 to be released from its suction mounting to the support 208 and the pistons 232 to be retracted within their respective cylinders 230 thus lowering the member 200 to the base 206 of the carriage 204.

If no bar code is located by the robotic arm 16, a query is sent to a display screen on the controller 22 to ask the operator if the member 200 is to be memorized as a new shape. If the operator responds in the affirmative, the controller 22 instructs the robotic arm 16 to retrieve the stylus tool from the tool bin 18. The robotic arm 16 then traces the entire surface of the member 200 and sends the corresponding coordinate values to the controller 22. The coordinate values are then stored by the controller 22 in a format which can be later retrieved by a CAD/CAM design system. Variations can be made to these coordinate values so that they can be turned into contouring instructions for that particular member for later contouring operations thereon.

During all contouring operations performed by the robotic arm 16 using the tool bits 144 installed within its tool mount 126, a large amount of airborne particulate fiberglass matter is produced. Therefore, during these contouring operations, the controller 22 actuates the vacuum filtration system 24 wherein the particular matter is suctioned into the hose 154 through the inlet conduit 156 and into the first filter 158. Larger particles are trapped in the first filter 158 and stored within the drum 166. Smaller particles are thrust into the outlet conduit 172 and into the second filter 160 where they are trapped in the filter therein and stored within the drum 168. The mounting of the hose 154 to the crane 186 of the boom support 180 provides slack control for the hose 154 due to the movement of the robotic arm 16.

As noted above, the safety system attached to the machine 10 can be calibrated to only detect exterior motion surrounding one of the working chambers 52 or 54 which thereby leaves the other working chambers available for workers to load a second member 202 onto an additional carriage 204 and roll the carriage into the opposite working chamber. When the robotic arm 16 has finished the contouring operations on the first member 200, the controller 22 can signal the movable frame 14 to slide forwardly to a point adjacent the forward beam 28 and then the robotic arm frame 114 to slide laterally though the gap 42 and into the other working chamber so that contouring operations can be performed on the second member 202. The safety systems can then be switched to detect motion in the second working chamber 54 while the completed member 200 is wheeled out of the first working chamber 52 and a new member can be rolled therein.

It is understood that the stationary frame 12 can have one or two working chambers. However, it should be noted that the stationary frame 12 can be made with more than two working chambers which could receive additional members therein.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A device for performing contouring operations on one or more three-dimensional members comprising:
    (a) a first frame defining at least two working chambers;
    (b) a second frame moveably mounted to the first frame;
    (c) an arm moveably mounted to the second frame for movement between the at least two working chambers, a portion of the arm being positionable in three dimensions in the working chambers and adapted to perform contouring operations in the working chambers
    (d) a stop member mounted to the first frame, and positioned to selectively bar movement of the arm between adjacent working chambers; and
    (e) a controller interconnected to the arm and the first and second frames for controlling the position of the second frame with respect to the first frame, the arm with respect to the second frame, and the positionable portion of the arm with respect to the arm.

2. The device of claim 1 and further comprising at least one positioning sensor mounted to the first frame and interconnected to the controller to signal the position of the second frame with respect to the first frame.

3. The device of claim 1 and further comprising at least one positioning sensor mounted to the second frame and interconnected to the controller to signal the position of the arm with respect to the second frame.

4. The device of claim 1 wherein the first frame is suspended in an elevated position.

5. The device of claim 4 wherein the first frame is defined by a forward beam, a rearward beam and a pair of side beams interconnected at their respective, ends to form a rectangular frame.

6. The device of claim 4 wherein the first frame is suspended by a plurality of posts having one end mounted to the first frame and a second end supported on a ground surface.

7. The device of claim 1 wherein the stop member comprises a beam defining adjacent working chambers, said beam having a gap enabling movement of the arm between adjacent working chambers.

8. The device of claim 6 wherein an end of the central beam is offset with respect to the first frame to define the passageway through which the arm can travel between the first and second chambers.

9. The device of claim 1 wherein one of the first and second frames has a rail mounted thereon, the other of the first and second frames has a slide mounted thereon, the rail being slidably received within the slide to mount the second frame to the first frame for slidable movement.

10. The device of claim 9 wherein one of the first and second frames has a rack gear, the other of the first and second frames has a pinion gear powered by a motor, the rack gear and pinion gear being mounted to the first and second frames so that the pinion gear is intermeshed with the rack gear whereby actuation of the motor moves the second frame with respect to the first frame.

11. The device of claim 1 wherein one of the first and second frames has a rack gear, the other of the first and second frames has a pinion gear powered by a motor, the rack gear and pinion gear being mounted to the first and second frames so that the pinion gear is intermeshed with the rack gear whereby actuation of the motor moves the second frame with respect to the first frame.

12. The device of claim 1 wherein one of the second frame and the arm has a rail mounted thereon, the other of the second frame and the arm has a slide mounted thereon, the rail being slidably received within the slide to mount the arm to the second frame for slidable movement.

13. The device of claim 12 wherein one of the second frame and the arm has a rack gear, the other of the second frame and the arm has a pinion gear powered by a motor, the rack gear and pinion gear being mounted to the first and second frames so that the pinion gear is intermeshed with the rack gear whereby actuation of the motor moves the second frame with respect to the first frame.

14. The device of claim 1 wherein one of the second frame and the arm has a rack gear, the other of the second frame and the arm has a pinion gear powered by a motor, the rack gear and pinion gear being mounted to the first and second frames so that the pinion gear is intermeshed with the rack gear whereby actuation of the motor moves the second frame with respect to the first frame.

15. The device of claim 1 wherein the arm comprises:
   (a) a housing mounted to the second frame for slidable motion with respect thereto; and
   (b) an arm assembly having a distal end and a proximal end, the proximal end being mounted to the housing and the distal end having a tool mount for selectively receiving a tool.

16. The device of claim 15 wherein the arm assembly comprises a first link, a second link, and a third link interconnected by pivotable joints.

17. The device of claim 16 wherein the arm assembly is rotatably mounted to the housing.

18. The device of claim 1 wherein the arm includes an optical scanning device adapted to detect indicia on a member adjacent the arm.

19. The device of claim 1 wherein the arm includes a stylus tool adapted to send coordinate data to the controller of a three-dimensional object located adjacent the arm.

20. The device of claim 1 and further comprising a tool bin located adjacent the first frame from which a tool can be selected by the arm.

21. The device of claim 20 wherein the tool bin comprises a carousel which removably mounts several tool bits therein.

22. The device of claim 21 wherein the tool bin defines a bit removal area thereon.

23. The device of claim 22 wherein the controller can position one of the arm and the carousel at the bit removal location whereby the arm can remove a tool therefrom.

24. The device of claim 1 and further comprising a vacuum filtration system adapted to collect airborne particles generated by the forming operations adjacent the distal end of the arm.

25. The device of claim 24 wherein the vacuum filtration system comprises:
   (a) a vacuum source;
   (b) a conduit having one end fluidly connected to the vacuum source and an opposite end mounted adjacent the distal end of the arm;
   (c) at least one filter located between the vacuum source and the end of the conduit;
      whereby actuation of the vacuum source suctions particles located adjacent the end of the conduit and traps them in the at least one filter.

26. The device of claim 25 wherein said at least one filter comprises a first filter and a second filter fluidly interconnected.

27. The device of claim 26 wherein the first filter is a cyclonic drum filter.

28. The device of claim 26 wherein the second filter is a HEPA filter.

29. The device of claim 26 and further comprising a boom assembly supported in an elevated position having an end which mounts a portion of the conduit whereby the boom assembly maintains slack in the conduit.

30. The device of claim 1 and further comprising at least one vacuum carriage located in at least one of said first and second chambers whereby each of said at least one vacuum carriage fixably supports a three-dimensional member.

31. The device of claim 30 wherein the vacuum comprises:
   (a) a base; and
   (b) a support member removably mounted to base for supporting the three dimensional object thereon in a fixed position.

32. The device of claim 31 wherein the base has at least two ground-engaging wheels.

33. The device of claim 31 wherein the support member is interconnected to vacuum source whereby the vacuum source draws the three-dimensional member against the support member to prevent the member from moving with respect to the first frame.

34. The device of claim 31 wherein the support member includes at least one post having an axial socket located in a distal end thereof.

35. The device of claim 34 and further comprising a cylinder having an axial piston movable between a retracted position and an extended position whereby in the extended position the piston is received in the axial socket of the support member and fixedly positions the support member with respect to the first frame.

36. The device of claim 1 and further comprising a safety barrier mounted adjacent the perimeter of the first frame.

37. The device of claim 1 and further comprising a safety speaker which emits an audile warning during operation of the device.

38. The device of claim 1 and further comprising a safety light which emits a visible warning during operation of the device.

39. The device of claim 1 and further comprising a light curtain located around the perimeter of the first frame.

40. The device of claim 39 wherein the light curtain comprises:
   (a) an optical emitter which emits a light signal; and
   (b) an optical detector adapted to detect the light signal from the optical emitter;
      whereby when the device is actuated an interruption of the light signal from the optical emitter causes one of the optical emitter and the optical detector to send a signal to the controller to suspend actuation of the device.

41. A cage for supporting a three-dimensional member during contouring operations thereon comprising:
   (1) a vacuum source; and
   (2) a support member having a working surface which has at least one conduit thereon which is fluidly interconnected to the vacuum source, wherein the support member also has a retainer operably connected with the working surface for maintaining the working surface in a fixed position during the contourine operations, wherein the retainer includes at least one post having an axial socket located in a distal end thereof;
      whereby a three-dimensional member can be located adjacent the working surface and actuation of the vacuum source produces a vacuum through the at least one conduit which draws the three-dimensional member against the working surface of the support member to prevent the three-dimensional member from moving during the contouring operations thereon.

42. The carriage of claim 41 and further comprising a cylinder having an axial piston movable between a retracted position and an extended position whereby in the extended position the piston is received in the axial socket of the retainer and fixably retains the support member.

43. A carriage for supporting a three-dimensional member during contouring operations thereon comprising:

(1) a vacuum source; and (2) a support member having a working surface which has at least one conduit thereon which is fluidly interconnected to the vacuum source, wherein the support member also has a retainer operably connected with the working surface for maintaining the working surface in a fixed position during the contouring operations, wherein the support member has at least two ground-engaging wheels;

whereby a three-dimensional member can be located adjacent the working surface and actuation of the vacuum source produces a vacuum through the at least one conduit which draws the three-dimensional member against the working surface of the support member to prevent the three-dimensional member from moving during the contouring operations thereon.

44. A method of forming contours on a three-dimensional object comprising the steps of:

(1) providing a first frame defining at least two working chambers, (2) a second frame movably mounted to the first frames, (3) an arm movably mounted to the second frame for movement between the at least two working chambers, a portion of the arm being positionable in three dimensions in the working chambers and adapted to perform contouring operations in the working chambers, (4) a tool on the positionable portion of the arm, (5) a stop member mounted to the first frame, and positioned to selectively bar movement of the arm between adjacent working chambers;

(6) positioning the second frame and the arm so that the arm is in one working chamber and, barred from movement to a second working chamber by the stop member;

(7) contacting and containing the object with the tool;

(8) with the one working chamber, whereby the second working chamber is simultaneously free of accidental intrusion by the arm.

* * * * *

UNITED STATES PATENT AND TRADEMARK OFFICE
CERTIFICATE OF CORRECTION

PATENT NO.: 5,938,501

DATED: August 17, 1999

INVENTOR(S): William J. Gerding and Jack N. Rabun, Jr.

It is certified that error appears in the above-identified patent and that said Letters Patent is hereby corrected as shown below:

Claim 1, col. 12, line 15, after "chambers", insert --;--.

Claim 5, col. 12, the actual line 36, after "respective", there should be no ",".

Claim 31, col. 14, line 13, after "vacuum", insert --carriage--.

Claim 31, col. 14, line 17, "three dimensional" should read --three-dimensional--.

Claim 41, col. 14, line 55, "cage" should read --carriage--.

Claim 41, col. 14, line 63, "contourine" should read --contouring--.

Claim 44, col. 16, the actual line 5, "frames" should read --frame--.

Claim 44, col. 16, the actual line 19, after "tool", there should be no ";".

Claim 44, col. 16 the actual line 20, "with" should read --within--.

Signed and Sealed this

Fourth Day of April, 2000

Q. TODD DICKINSON

*Attest:*

*Attesting Officer*     *Director of Patents and Trademarks*